(12) United States Patent
Brocke et al.

(10) Patent No.: US 12,134,242 B2
(45) Date of Patent: Nov. 5, 2024

(54) METHOD FOR COMPACTING A HARVESTED MATERIAL

(71) Applicant: DEERE & COMPANY, Moline, IL (US)

(72) Inventors: Stefan Brocke, Mannheim (DE); Norbert Fritz, Ilvesheim (DE)

(73) Assignee: Deere & Company, Moline, IL (US)

( * ) Notice: Subject to any disclaimer, the term of this patent is extended or adjusted under 35 U.S.C. 154(b) by 312 days.

(21) Appl. No.: 17/810,872

(22) Filed: Jul. 6, 2022

(65) Prior Publication Data

US 2023/0034813 A1 Feb. 2, 2023

(30) Foreign Application Priority Data

Jul. 29, 2021 (DE) .......................... 102021119684.1

(51) Int. Cl.
*B30B 15/26* (2006.01)
*A01F 25/16* (2006.01)
*A01F 25/18* (2006.01)
*E04H 7/22* (2006.01)

(52) U.S. Cl.
CPC ............ *B30B 15/26* (2013.01); *A01F 25/166* (2013.01); *A01F 25/18* (2013.01); *E04H 7/22* (2013.01)

(58) Field of Classification Search
CPC ........ B30B 15/26; A01F 25/16; A01F 25/166; A01F 25/18; E04H 7/22
See application file for complete search history.

(56) References Cited

U.S. PATENT DOCUMENTS

| 2,788,247 | A  | * | 4/1957 | Roland | ............... A01F 25/2009 |
|---|---|---|---|---|---|
|  |  |  |  |  | 414/322 |
| 7,503,160 | B2 |   | 3/2009 | Degen et al. |  |
| 2018/0332760 | A1 | * | 11/2018 | Gresch | ................. A01B 63/111 |
| 2021/0321571 | A1 |   | 10/2021 | Brocke et al. |  |

FOREIGN PATENT DOCUMENTS

| DE | 102011117860 A1 | * | 5/2013 | ........... A01D 43/085 |
|---|---|---|---|---|
| DE | 102017104008 A1 | * | 8/2018 | ........... A01B 79/005 |
| DE | 102017110471 A1 | * | 11/2018 | ............. A01B 69/00 |
| DE | 102017130300 A1 |   | 6/2019 |  |
| DE | 102018000148 A1 |   | 7/2019 |  |
| EP | 1825740 A1 |   | 8/2007 |  |
| EP | 3403488 A1 |   | 11/2018 |  |
| EP | 3895520 A1 |   | 10/2021 |  |

OTHER PUBLICATIONS

European Search Report issued in European Patent Application No. 22183294.2, dated Dec. 9, 2022, 7 pages.

* cited by examiner

*Primary Examiner* — Jimmy T Nguyen

(57) ABSTRACT

A method for compacting a harvested material in a silo by an agricultural working machine includes determining via a control unit a density profile which represents a target density of the harvested material as a function of a silo position or a silo portion along a predetermined silo length of the silo, controlling via the control unit compaction work as a function of the density profile, and controlling via the control unit a travel speed of the working machine during the compaction work as a function of the density profile.

18 Claims, 2 Drawing Sheets

METHOD FOR COMPACTING A HARVESTED MATERIAL

CROSS-REFERENCE TO RELATED APPLICATIONS

This application claims priority to German Patent Application No. 102021119684.1, filed Jul. 29, 2021, which is hereby incorporated by reference.

FIELD OF THE DISCLOSURE

The present disclosure relates to a method for compacting a harvested material.

BACKGROUND

Silage is a type of fodder which is produced from green foliage plants which are stored in a silo. Some farmers deposit the silage in large heaps on the ground and to drive over the silage with a tractor to force out the air and then to cover it with plastic sheeting. Other farmers unload the silage in so-called bunker silos with a base and walls made of concrete or other materials. In this case, the compacting and sealing are also carried out by plastic sheeting. The packing density of the fodder influences the quality of the silage obtained.

SUMMARY

In EP 1825740 A1, a control and evaluation unit of an agricultural working machine receives a rebound signal as data. The rebound signal is proportional to a rebound of the harvested material to be compacted. As a function of the rebound behavior of the harvested material to be compacted, the working machine may bring about a more intensive or less intensive compaction of the harvested material.

The object of the present disclosure is to improve the working efficiency when constructing a silo. This object is achieved by one or more of the following embodiments. Further advantageous embodiments of the method according to the disclosure are apparent from the following.

According to an aspect of the present disclosure, in a method for compacting a harvested material in a silo by means of an agricultural machine it is provided that the compaction work thereof (and thus the compaction performance) is controlled as a function of at least one piece of control information. A density profile, which represents a target density of the harvested material as a function of a silo position or a silo portion along a predetermined silo length of the silo, is determined as control information. A travel speed of the working machine is controlled during the compaction process or during the compaction work as a function of the determined density profile.

The travel speed which is influenced by the control may refer to a forward pass and/or to a reverse pass of the working machine.

For controlling the travel speed of the working machine, therefore, at least the density profile is considered as control information. In this case it is not excluded that further control information, such as for example information regarding a vehicle tire pressure, is also considered for influencing and controlling the travel speed. The data of the density profile may be used directly for controlling the travel speed. Alternatively, specific control signals may be derived from the density profile for controlling the travel speed, so that the density profile serves at least indirectly for controlling the travel speed.

In some embodiments, variables and data for determining the density profile may also be considered as control information since the travel speed of the working machine is indirectly controlled by these variables and data.

The density profile with the target density influences the travel speed of the working machine and thereby significantly increases the efficiency of the compaction process, since silo portions of the predetermined silo length with a relatively low target density may be already produced at a relatively high travel speed of the working machine. When considering this relationship, the working machine, on the one hand, may save working time in silo portions of the silo length with a lower target density (by a greater travel speed) and, on the other hand, invest more working time in silo portions of the silo length with a higher target density (by a lower travel speed).

As a result, therefore, the target density of the stored harvested material which is already sufficient for the stability of the silage is produced along the predetermined silo length. This procedure helps to reduce the working time and machine effort when creating or constructing the silo, notwithstanding the production of stable silage. Stable silage is produced very efficiently thereby. As a result, any deterioration in the nutritional content of the silage or nutritional losses due to heating are avoided in an efficient manner.

By means of the density profile, the compaction work may be carried out efficiently when constructing the silo. At the same time the silage may be provided with a stable feed quality during the storage time and the entire extraction time from the silo.

For example, the target density may also consider the variable heating behavior of the silage during the extraction of the feed rate for the animals to be fed at different times of the year. With different target densities along the silo length, therefore, any reduction in feed quality during the extraction and the degradation of the silage may also be prevented in a very efficient manner.

The agricultural working machine contains at least one self-propelled vehicle (for example a towing vehicle, tractor). For example, a compaction device (for example a silo compaction roller) is assigned to the vehicle for compacting the harvested material. Alternatively, the vehicle may be used without a separate compaction device, for example for compacting the harvested material in the silo using the vehicle tires thereof.

For example, the harvested material is initially spread in layers in the silo to be constructed and then compacted before a further harvested material layer is spread onto the last compacted harvested material layer and then compacted. This process is then repeated until a planned or predetermined quantity of harvested material is stored within the predetermined dimensioning of the silo.

The compaction process for an individual harvested material layer contains either a single compaction cycle (for example a forward pass or a combined forward and reverse pass of the working machine) or a sequence of a plurality of compaction cycles (for example a plurality of combined forward and reverse passes).

The silo (for example a bunker silo) has, for example, a fixed bottom slab and fixed side walls. For example, fresh or wilted biomass (for example cut material, green fodder) is stored as harvested material in the silo.

By determining a specific density profile, it is possible to consider that different values of the target density, as a function of different influence variables and factors along the predetermined silo length, are sufficient in order to achieve a good preservation of the harvested material and thus a good stability of the silage.

For example, for determining the density profile at least one of the following variables is considered:
- a predetermined quantity (for example volume or mass) of the harvested material to be compacted or stored,
- a predetermined dimensioning of the silo, for example a predetermined silo cross section transversely to the predetermined silo length,
- a feed rate (for example feed quantity or volume of the silage per week) for the animals to be fed,
- a predetermined start time (for example calendar date) of the first extraction of silage from the silo,
- an extraction time period (for example a calendar-related time period, a number of days or weeks) for the extraction of silage from the silo, and
- at least one environmental parameter (for example average ambient temperature, average air humidity) of the silo environment during an extraction time period for the extraction of silage from the silo.

The values of the aforementioned variables are available in a simple and accurate manner since they partially represent planning data for the silo dimensioning and the subsequent use of the silo and may be partially recalled as weather data.

In an embodiment, the density profile is determined as a function of a comparison between an extraction rate and a target rate. In this case, the extraction rate is dependent on a feed quantity for the animals to be fed, which is required in an extraction time period (for example several days, a week or a time period in a specific calendar month) from the silo. The target rate, however, is determined independently of the feed quantity required for the same extraction time period from the silo. For example, the target rate is determined such that a deterioration in the silage (reduction in nutrient content, spoilage, etc.) is avoided. This is based on the idea that with higher ambient temperatures a more rapid heating of the silage occurs and thus a more rapid decline in the feed quality. With a specific target feedout rate as the target rate along the silo length, a reduction in quality due to the heating of the silage still being stored may be prevented. The target rate thus may be considered at least as a required rate by which any decline in the feed quality is avoided during the use of the silo.

This target feedout rate (depending on the outside temperature) may be, for example, 2.5 meters per week in summer and 1.5 meters per week in winter. The target rate or the target feedout rate is thus defined as a target speed along the silo length, whilst the extraction rate is defined as an extraction speed along the silo length.

The actual extraction rate may not be substantially altered in many cases, thus for example not in the case of a substantially uniform feed quantity which is required per time unit for the animals to be fed. Thus, the extraction rate, for example in winter, is significantly higher than the determined target rate, since the extraction rate is adapted to the summer (by the unchanged dimensioning of the silo) in order to avoid the aforementioned drawbacks of reduced feed quality. As a result, there is substantially no risk of undesired heating of the silage in winter.

This relationship may also be advantageously used for calendar-related extraction time periods or for portions along the silo length with a determined low target rate, in order to set a lower target density of the harvested material to be compacted. Since in this extraction time period or portion of the silo length the extraction rate is higher than is necessary, in this case the lower target density remains without having a negative influence on the desired stability of the silage.

In summary, a comparison between the above-described variables of the extraction rate and the target rate assists the determination of an optimized density profile, which permits a significantly improved efficiency of the compaction work when constructing the planned silo.

In an embodiment, the already described extraction rate is determined as a function of at least one of the following variables:
- a predetermined silo cross section transversely to the pre-determined silo length, and
- a feed rate (for example feed quantity or volume of silage per week) for the animals to be fed.

For example, the extraction rate is produced as an extraction speed (for example in meters per week), by the feed rate (for example feed volume per week) and the predetermined silo cross section (i.e., silo width×silo height) being related to one another as quotients.

The already described target rate is advantageously determined as a function of at least one of the following variables:
- a predetermined start time for the first extraction of silage from the silo,
- the extraction time period, and
- at least one environmental parameter of the environment of the silo during the extraction time period.

The consideration of the predetermined start time makes it possible to assign each silo position to an extraction time or extraction time period within the calendar year. The start time and the extraction time periods may be advantageously provided within the context of a previously known or predetermined extraction time profile. For greater accuracy, environmental parameters (for example ambient temperature, air humidity) may also be considered, the values thereof being known at least as average values for the respective extraction time or extraction time period. Thus, by using simple physical variables for each silo position, the value of the target rate (for example the target speed) which is desired for efficient compaction work may be accurately determined.

For example, the working machine contains a control unit for processing received data. An automated implementation of the method for compacting the harvested material may be assisted by this control unit. For example, even the density profile is determined by corresponding data processing in this control unit. The data may contain, for example, values of the already described variables, the density profile being determined as a function thereof.

In order to provide the data using little technical effort, this data may be transmitted from an external data source (for example data center) via a radio connection to the control unit. Additionally, or alternatively, data may be transmitted via a user interface of the working machine to the control unit. Thus, the transmission of the data to the control unit may be carried out partially or fully automatically, which correspondingly relieves the driver of the working machine of the task of determining the density profile.

A technically simple and automatic influencing or changing of the travel speed of the working machine is achieved as a function of the density profile, by the aforementioned control unit activating a speed-control function (for example engine control unit) of the working machine.

The above and other features will become apparent from the following detailed description and accompanying drawings.

BRIEF DESCRIPTION OF THE DRAWINGS

The method according to the disclosure is described in more detail hereinafter with reference to the accompanying drawings. In this case, components which coincide or which are comparable regarding the function thereof are identified by the same reference numerals. In the drawings.

DETAILED DESCRIPTION

The embodiments or implementations disclosed in the above drawings and the following detailed description are not intended to be exhaustive or to limit the present disclosure to these embodiments or implementations.

Figure 1:
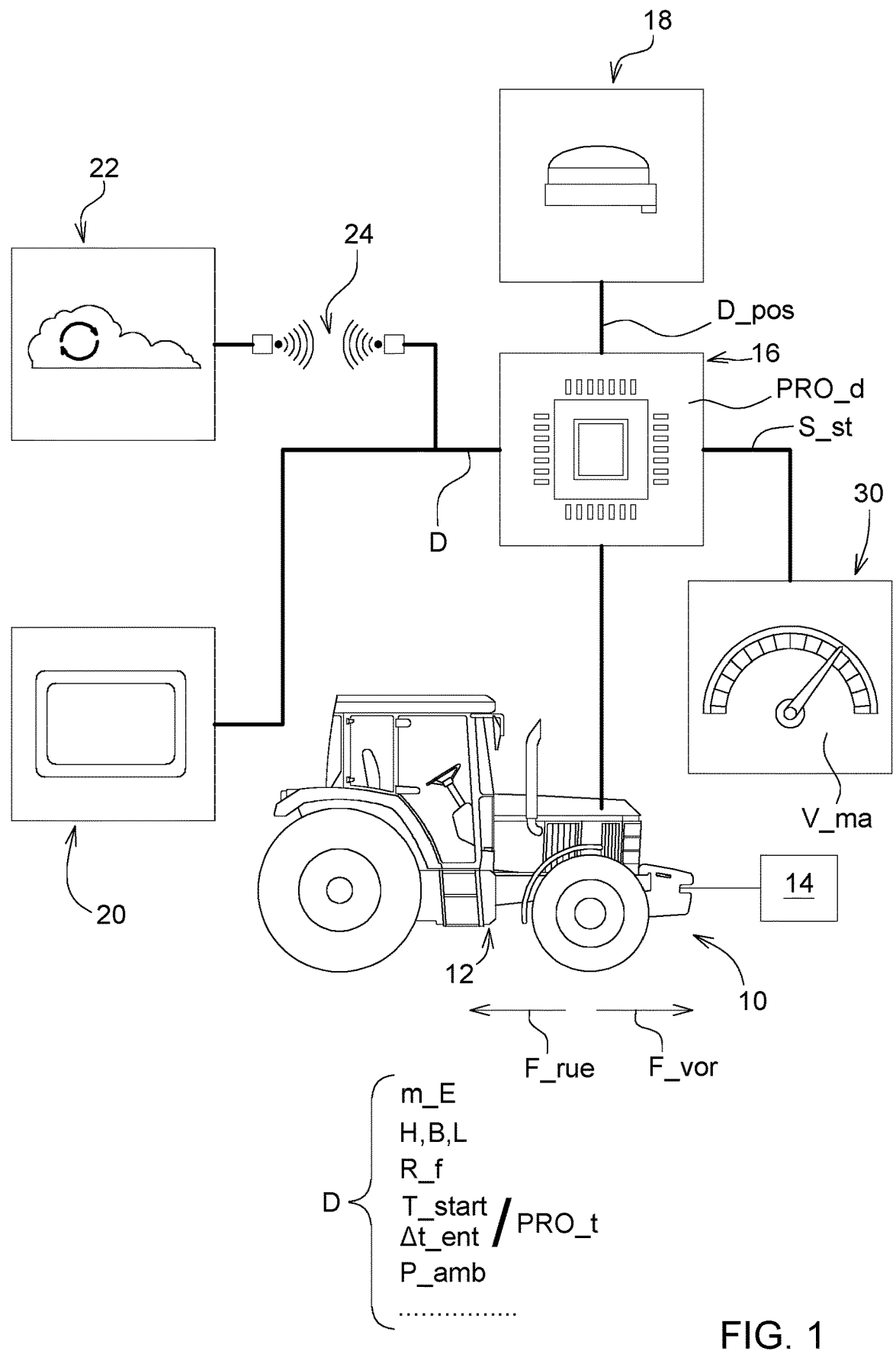
FIG. 1 shows a schematic view in the manner of a block diagram of functional units for an agricultural working machine for carrying out the method according to the disclosure.

FIG. 1 shows an agricultural working machine 10 with a tractor 12 and a compaction device 14 coupled thereto on the front side. The compaction device is shown merely schematically as a block which is representative of different embodiments, for example of a silo compaction roller. Although the compaction device 14 in FIG. 1 is mounted on the tractor 12 on the front side, in alternative or additional variants compaction devices 14 which are mounted on the rear side are also conceivable. In further embodiments, the tractor 12 may be replaced by another suitable self-propelled vehicle.

A control unit 16 which is integrated in the working machine 10, more specifically in the tractor 12, receives different data D for data processing and for determining a density profile PRO_d which results from the data processing and which is described below in further detail. For determining the density profile PRO_d, optionally positional data D_pos of a position detection system 18 (for example GPS) of the working machine 10 may also be considered.

The data D may be manually predetermined, for example, by a user interface 20 which is integrated in the tractor 12 (for example a visual display unit, screen, input unit, etc.) and/or may be provided from an external data source 22 (for example an external data computing center) via a wireless data connection 24 (for example a mobile communication system) of the control unit 16.

For example at least one variable of the following listed variables is used as the data D:
- a predetermined quantity m_E (for example volume or mass) of the harvested material 26 to be compacted in a silo 28;
- a predetermined dimensioning of the silo 28, for example
  - a predetermined silo cross section A as the product of a silo height H and a silo width B, wherein the silo cross section A runs transversely to a predetermined silo length L;
- a feed rate R_f for the animals to be fed;
- a predetermined start time T_start for the first extraction of compacted harvested material 26 from the silo 28;
- an extraction time period Δt_ent for the extraction of compacted harvested material 26 from the silo 28; and
- at least one environmental parameter P_amb (for example ambient temperature, air humidity) of the environment of the silo 28 during an extraction time period Δt_ent for the extraction of compacted harvested material 26 from the silo 28.

The aforementioned variables partially form planning data for the planned dimensioning of the silo 28 and for the subsequent extraction of compacted harvested material 26 from the silo 28 in the context of a planned extraction time profile PRO_t. In some cases, the aforementioned variables may be expediently recalled as weather data. Depending on the data-technical organization of the planned construction of the silo 28, the values of the aforementioned variables may then be transmitted via the user interface 20 and/or the external data source 22 to the control unit 16.

Figure 2:
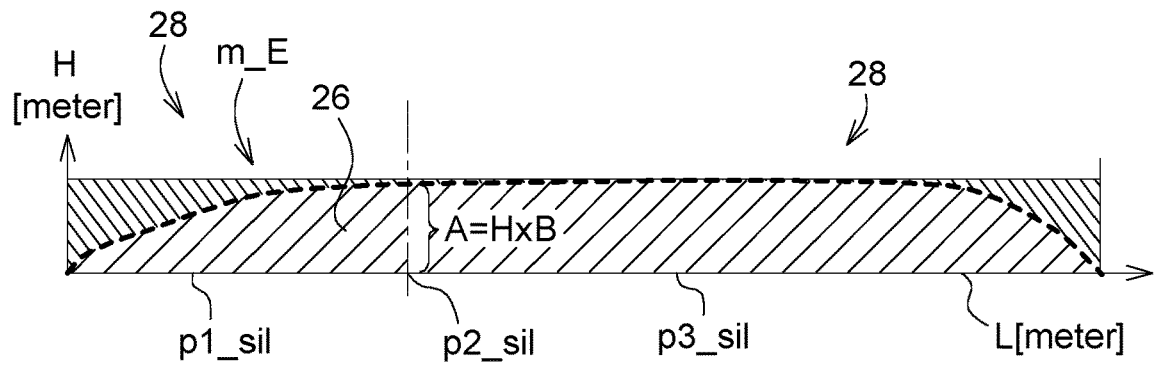
FIG. 2 shows a diagram which represents a dimensioning of a silo.

The density profile PRO_d is determined as a function of at least one variable of the aforementioned variables and optionally also further variables, not cited here, which are combined together as the data D in FIG. 1. The density profile PRO_d which is determined in such a manner represents a target density of the harvested material 26 as a function of a silo position along the predetermined silo length L of the silo 28. In FIG. 2 the positions p1_sil, p2_sil and p3_sil are indicated as individual silo positions by way of example.

The control unit 16 activates a speed control function 30 (for example an engine control unit) of the working machine 10 or of the tractor 12 as a function of the determined density profile PRO_d, in order to influence thereby a travel speed v_ma of the working machine 10 or the tractor 12. The influence of the travel speed v_ma may refer to a forward pass F_vor and/or a reverse pass F_rue of the working machine 10 or the tractor 12.

For controlling the travel speed v_ma, the control unit 16 transmits corresponding control signals S_st to the speed control function 30. The control signals S_st represent, for example, the density profile PRO_d or are determined in the control unit 16 by computer deduction from the density profile PRO_d.

For the planned construction of the silo 28 initially dimensioning data, for example the silo length L, the silo height H and the silo width B, are predetermined (FIG. 2).

An actual or current extraction rate or extraction speed v_akt (for example in meters per week) may be calculated from the silo cross section A and the known feed rate R_f (for example in metric tons per week) for the animals to be fed. This current extraction speed v_akt represents the feed quantity actually required for the animals to be fed in a specific extraction time period Δt_ent (for example a week).

Figure 3:
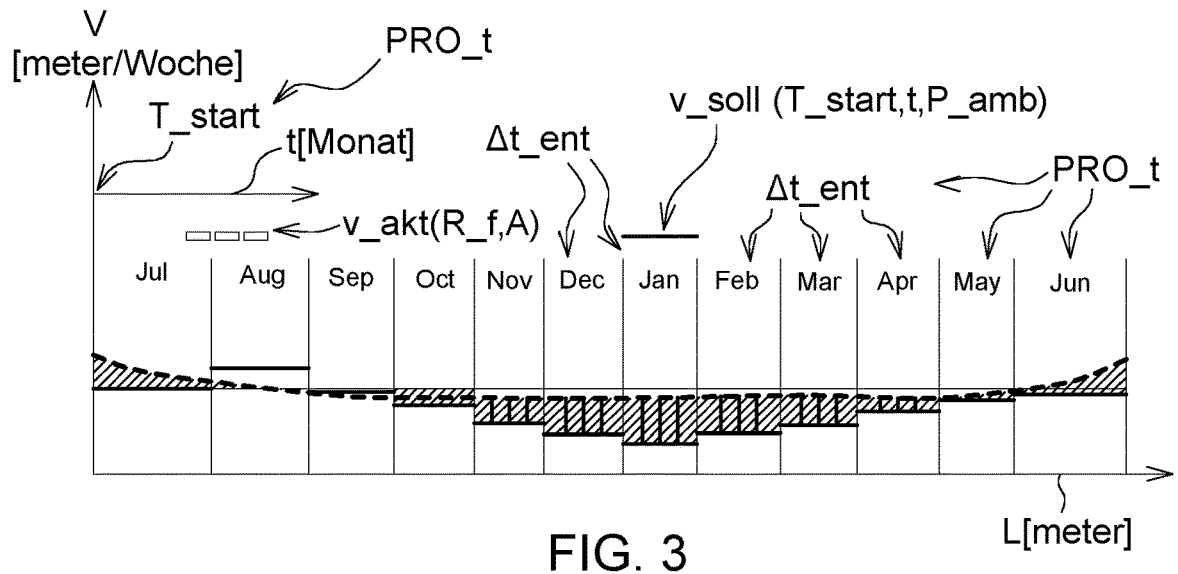
FIG. 3 shows a diagram which represents different extraction speeds.

The current extraction speed v_akt is compared along a time axis tin each extraction time period Δt_ent of the extraction time profile PRO_t with a target rate or target speed v_soll (FIG. 3).

The target rate or target speed v_soll is dimensioned as a required minimum rate during the feed extraction from the silo 28 when considering the extraction time profile PRO_t (for example the start time T_start and the extraction time periods Δt_ent) and at least one environmental parameter P_amb, in order to avoid any reduction in the feed quality during the use of the silo 28.

Figure 4:
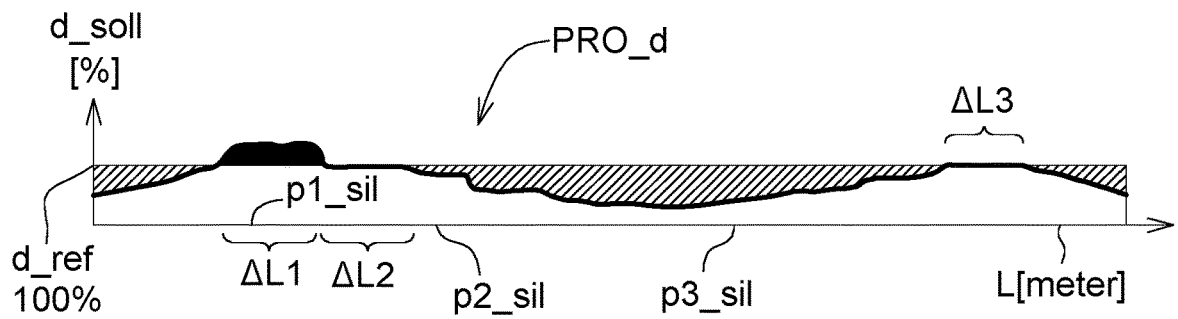
FIG. 4 shows a diagram which represents a determined density profile.

According to the above explanations, in the extraction time periods Δt_ent in which the actual extraction speed v_akt is less than the required target speed v_soll, during the construction of the silo 28 a higher target density d_soll is provided in comparison with a reference density d_ref=100%. In the example shown, this is in the extraction time period Δt_ent or calendar month of August (FIG. 4). When considering the extraction time profile PRO_t, this refers to a silo portion along the silo length L.

Moreover, in the example according to FIG. 4 the extraction speed v_akt, on the one hand, and the target speed v_soll, on the other hand, are substantially identical in the extraction time periods Δt_ent or calendar months of September and May, so that in these time periods the target density d_soll corresponds to the reference density d_ref=100%. When considering the extraction time profile PRO_t, this refers to the silo portions ΔL2 and ΔL3 along the silo length L.

In the remaining extraction time periods Δt_ent or calendar months according to FIG. 4, the target speed v_soll is less than the actual extraction speed v_akt. As a result, a lower target density d_soll may be provided here in comparison with the reference density d_ref=100%.

The aforementioned density profile PRO_d may be determined (FIG. 4) as a function of the above-described comparison between the extraction speed v_akt and the target speed v_soll (FIG. 3). The density profile represents the target density d_soll of the harvested material 26 to be compacted as a function of the respective silo position (for example p1_sil, p2_sil, p3_sil) or of the respective silo portion (for example ΔL1, ΔL2, ΔL3) along the silo length L.

Figure 5:
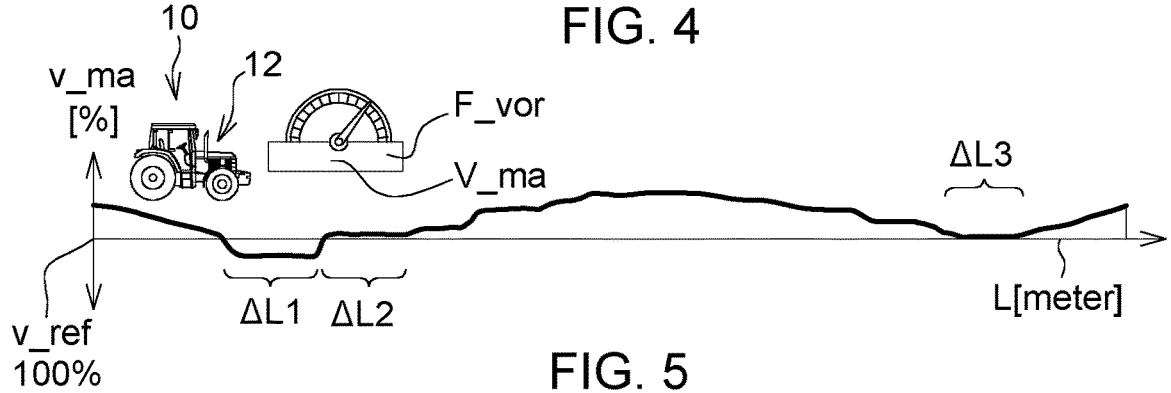
FIG. 5 shows a diagram which represents a travel speed of the working machine as a function of the determined density profile.

As already described, the travel speed v_ma of the working machine 10, 12 is controlled via the determined density profile PRO_d (FIG. 5). According to the described relationships, in the silo portion ΔL1 the travel speed v_ma is decelerated in comparison with a reference speed v_ref=100%, which corresponds to the reference density d_ref. As a result, more working time is invested for the compaction in the silo portion ΔL1.

In the silo portions ΔL2 and ΔL3 the travel speed v_ma corresponds to the reference speed v_ref.

However, in the remaining silo portions of the silo length L, the travel speed v_ma may be increased relative to the reference speed v_ref and thus working time may be saved during the compaction process.

The efficiency of the compaction work during the construction of the silo 28 may be significantly improved by means of the optimized density profile PRO_d.

For the sake of clarity, it should be mentioned that schematic details shown in the drawings are not necessarily to scale. Furthermore, no claim is made in the diagrams shown as regards scale or exact quantitative values.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A method for compacting a harvested material in a silo by an agricultural working machine, comprising:
   determining via a control unit a density profile which represents a target density of the harvested material as a function of a silo position or a silo portion along a predetermined silo length of the silo;
   controlling via the control unit a compaction work by a silo compaction device as a function of the density profile; and
   controlling via the control unit a travel speed of the agricultural working machine during the compaction work as a function of the density profile,
   wherein the control unit determines the density profile as a function of a comparison between an extraction rate and a target rate, wherein the extraction rate is dependent on a feed quantity for animals to be fed in an extraction time period from the silo, and wherein the target rate is determined independently of the feed quantity required for the same extraction time period from the silo.

2. The method of claim 1, wherein the control unit determines the density profile a function of at least one of the following variables:
   a predetermined quantity of the harvested material to be compacted;
   a predetermined silo cross section transversely to the predetermined silo length;
   a feed rate for animals to be fed;
   a predetermined start time of a first extraction of compacted harvested material from the silo;
   an extraction time period for the extraction of compacted harvested material from the silo; and
   at least one environmental parameter of a silo environment during an extraction time period for the extraction of compacted harvested material from the silo.

3. The method of claim 1, wherein the extraction rate is defined as an extraction speed along the silo length, and the target rate is defined as a target speed along the silo length.

4. The method of claim 1, wherein the extraction rate is determined as a function of at least one of the following variables:
   a predetermined silo cross section transversely to the predetermined silo length; and
   a feed rate for animals to be fed.

5. The method of claim 1, wherein the target rate is determined as a function of at least one of the following variables:

a predetermined start time of a first extraction of compacted harvested material from the silo;

an extraction time period; and at least one environmental parameter of an environment of the silo during the extraction time period.

6. The method of claim 1, wherein the control unit receives data from a user interface for determining the density profile.

7. The method of claim 1, wherein the control unit receives data from an external data source for determining the density profile.

8. The method of claim 6, wherein the control unit activates a speed control function of the agricultural working machine as a function of the determined density profile.

9. The method of claim 1, wherein the agricultural working machine includes the control unit.

10. An agricultural working machine for compacting a harvested material in a silo, comprising:

a control unit configured to determine a density profile which represents a target density of the harvested material as a function of a silo position or a silo portion along a predetermined silo length of the silo;

the control unit configured to control a compaction work by a silo compaction device connected to the agricultural working machine as a function of the density profile;

the control unit configured to control a travel speed of the agricultural working machine during the compaction work as a function of the density profile; and the control unit configured to determines the density profile as a function of a comparison between an extraction rate and a target rate, wherein the extraction rate is dependent on a feed quantity for animals to be fed in an extraction time period from the silo, and wherein the target rate is determined independently of the feed quantity required for the same extraction time period from the silo.

11. The agricultural working machine of claim 10, wherein the control unit is configured to determine the density profile a function of at least one of the following variables:

a predetermined quantity of the harvested material to be compacted;

a predetermined silo cross section transversely to the predetermined silo length;

a feed rate for animals to be fed;

a predetermined start time of a first extraction of compacted harvested material from the silo;

an extraction time period for the extraction of compacted harvested material from the silo; and at least one environmental parameter of a silo environment during an extraction time period for the extraction of compacted harvested material from the silo.

12. The agricultural working machine of claim 10, wherein the extraction rate is defined as an extraction speed along the silo length, and the target rate is defined as a target speed along the silo length.

13. The agricultural working machine of claim 10, wherein the extraction rate is determined as a function of at least one of the following variables:

a predetermined silo cross section transversely to the predetermined silo length; and a feed rate for animals to be fed.

14. The agricultural working machine of claim 10, wherein the target rate is determined as a function of at least one of the following variables:

a predetermined start time of a first extraction of compacted harvested material from the silo;

an extraction time period; and at least one environmental parameter of an environment of the silo during the extraction time period.

15. The agricultural working machine of claim 10, wherein the control unit is configured to receive data from a user interface for determining the density profile.

16. The agricultural working machine of claim 15, wherein the control unit is configured to activate a speed control function of the agricultural working machine as a function of the determined density profile.

17. The agricultural working machine of claim 10, wherein the control unit is configured to receive data from an external data source for determining the density profile.

18. The agricultural working machine of claim 17, wherein the control unit is configured to activate a speed control function of the agricultural working machine as a function of the determined density profile.

* * * * *